3,298,902
PROCESS OF FORMING CELLULOSIC PAPER CONTAINING TRIS-(1-AZIRIDINYL) PHOSPHINE OXIDE AND POLYETHYLENE IMINE AND PAPER THEREOF
Hans Osborg, Port Washington, N.Y., and John W. Brook, East Brunswick, and Albert Goldstein, New Shrewsbury, N.J., assignors to Chemirad Corporation, East Brunswick, N.J., a corporation of Delaware
No Drawing. Filed June 26, 1964, Ser. No. 378,426
7 Claims. (Cl. 162—158)

The invention relates to improved cellulose fibrous products, such as paper, having a combination of desirable properties, in particular increased strength and stiffness. The invention also relates to methods for manufacturing these improved cellulose products.

The invention concerns a cellulose fibrous product comprising fibers treated with tris-(1-aziridinyl) phosphine oxide, hereinafter designated as APO, and with a process of making these products.

Improved paper products are becoming increasingly necessary in modern applications. In an attempt to fill this need, it has been recently suggested to use polyethylene imine as a beater additive in making paper. But the paper products still have shortcomings, particularly in stiffness and strength, in numerous applications where such properties are required.

The improved cellulose products of the invention comprise fibers treated with APO. The invention also provides improved cellulosic and paper products comprising fibers treated with APO and a polyalkylene imine, particularly with polyethylene imine, hereinafter designated as PEI.

The paper products of the invention fulfill an important need in modern packaging for materials of increased strength and improved stiffness. The paper products are ideally suited for making paperboard products which are exposed to dampness or refrigeration and also to pressure and shock.

Another embodiment of the invention provides for processes which comprise treating cellulose fibers, particularly in aqueous suspension, with APO alone and, in another aspect of the invention, with both APO and PEI. A special advantage of the process is that it provides a method for treating paper stock with PEI, not only under basic conditions, but also under acidic conditions, in conjunction with APO. The cellulose products of the invention may be unsized or sized with acidic or neutral sizing agents.

In accordance with the invention, an aqueous suspension of cellulose fibers is treated with APO. In another aspect of the invention the cellulose fibers, in aqueous suspension, are treated with APO and a polyalkylene imine. The treated fibers are then dried and cured to give the products of this invention. The polyalkylene imines useful in this invention are typified by polyethylene imine and by other polyethylene imines which have one or more lower alkyl substituents on the carbon atoms of the ethylene chain such as poly-(2-methylethylene imine), poly-(2-ethylethylene imine), poly-(2,2-dimethylethylene imine) and the like. Polyethylene imine is preferred.

The polyalkylene imine which is used in the invention, in conjunction with the APO, is a water-soluble polymer which is substantive, i.e., it is characterized by substantial exhaustion onto the paper fibers and even distribution thereon without the need of addition of a precipitating or fixing agent to the cellulose fibers. The polymer retains its substantivity under processing conditions. The reaction of the polyalkylene imine with the cellulose fibers is enhanced, in a synergistic manner, by the presence of APO.

Tris-(1-aziridinyl) phosphine oxide which is used in the invention is obtainable from the reaction of ethylene imine with phosphorus oxy trichloride under basic conditions.

The process of the invention comprises adding the APO and the polyalkylene imine to an aqueous suspension of cellulose fibers. For optimum results, contact between the fibers in suspension and the polymer and the APO should be promoted to insure fullest adsorption and future development of the improved properties. Thus, the APO and the polyalkylene imine may be added to a dilute aqueous suspension of paper pulp, as in the beater stock chest, fan pump, and so forth, a papermaking system, with agitation or mixing.

In producing fibrous products in accordance with the invention any suitable type of fibrous material may be employed, such as cotton fibers, cotton linters, wool or rag fibers as well as asbestos or mineral fibers. The invention is particularly valuable for the preparation of modified paper or paperboard sheets from cellulosic fibers in the form of bleached or unbleached wood pulps, including sulfite, kraft, soda, semi-chemical, and groundwood pulps, as well as rag pulp, rope pulp, jute pulp, and the like. The pulp may be unbeaten, highly beaten or lightly beaten before the treatment.

The pulp slurry in water may be acidic, neutral or alkaline. The preferred pH range is on the alkaline side from 7 to 11, preferably the pH ranges from 7.5 to 10. The invention, however, also provides a process for treating cellulose fibers under acidic conditions with APO alone, or with APO and a polyalkylene imine, such as polyethylene imine. Thus, the process of the invention can be carried out at pH ranges above 7.0, or below 5.0. The desired acid pH may be reached by adjustments with suitable acidic material, such as strong mineral acids. For adjustments to the alkali side, hydroxides of the alkali metals or alkaline earth metals, such as sodium or potassium, may be used.

The polyethylene imine resin which is used in the invention may be provided to the aqueous suspension of fibers as a dilute aqueous solution, over a wide range of concentration, as from 0.01 to 10%, or higher if desired. The amount of polymer to be added will vary with a number of factors including the degree of improvement desired. In most cases, from about 0.01 to about 5% of the polymer, based on the dry weight of fiber, gives satisfactory results. A desirable practical range is from 0.025 to 0.5%. It is an advantage of the process of the invention that comparatively small amounts of the polymer are effective to yield improved paper products since the effect of the polymer is enhanced by the APO. But larger amounts, such as 50% of the weight of the fiber, may also be used.

The amount of APO that may be used also may be varied considerably. It has been found satisfactory to use about 0.04 to 10% of APO based on the dry weight of the fibers. A practical concentration of APO may range from 0.1 to 1%, preferably 0.2 to 0.8%. When the APO is used with the polyethylene imine the ratio of concentration of polyethylene imine to APO may vary from 1 to 1 to 1 to 10, respectively. A ratio of 1 to 4 of polymer to APO is very satisfactory. If desired, however, the amounts of polymer can be used in an amount exceeding the amount of APO. The exact amount of APO and polyethylene imine may be adjusted to fit the type of paper treated and magnitude of improvements desired.

The papermaking process of the present invention is applicable to any type of hydrated cellulose fiber at any convenient consistency of the fibrous suspension. The preferred consistency is that which promotes rapid and uniform distribution and contacting of the additives and the fibers. The consistency of the paper pulp may be as low as 0.1% or as high as 10%. Preferably the consistency is dilute, as between 0.1% to 1.0%, based on the dry weight of the fibers. For optimum results the fibrous suspension should be gently stirred for some time to promote uniform distribution of the additive after its addition to the suspension to allow maximum adsorption and interaction of substrate and additive.

The polyalkylene imine and APO may be added to the suspension of cellulose fibers in any order desired. However, unexpectedly, it has been found that best results are obtained when the APO is added first, or simultaneously with, the polyalkylene imine, rather than after it. Both additives may also be added to separate portions of the fiber suspension and then combined by admixing to the main fiber suspension.

After adsorption of the polymer and APO, the fibers may be formed into a sheet on any suitable equipment, such as on any of the various types of papermaking equipment including laboratory types having sieves or screens for making handsheets as well as commercial machines, such as Fourdrinier and Cylinder machines. The cellulosic product is then cured. The curing apparently imparts permanence to the chemical bonding between the cellulose molecules and the additives, as well as between the additives themselves. Thus, to complete the reaction of the polymer and the APO, and the reaction with the cellulose, it is desirable to heat the treated paper at a temperature in the range of 100° to 250° C., generally 100° to 150° C. for a time sufficient to cure the paper, or to permit the reaction to go to completion as by allowing the paper roll to remain in storage for several days.

The process of the invention may be carried out in the presence of or in conjunction with conventional sizing materials, or other conventional pulp additives such as pigments, fillers, such as titanium dioxide, talc or clays. Likewise, if desired, there may be used an emulsifier or dispersing agent, such as non-ionic emulsifiers, as an aid in dispersing the cellulose fibers.

In the following examples which are illustrative of the invention, all percentages are expressed on solids basis, based on the weight of the dry fiber.

EXAMPLE 1

(a) A slurry of unbleached softwood kraft pulp of a consistency of 2.2% is beaten in a beater to a 30° Schopper-Riegler (SR) freeness. The beaten stock is diluted in a sheet machine proportioner to a consistency of 0.29% prior to formation into handsheets of 40 lb. (24" x 36"/500 ream) basis weight. The pH was 8. The dilute stock is stirred, the wet web is formed in the sheet mold, pressed with a cylinder press, dried over a drum dryer for 3 minutes at 95° C., cured for 10 minutes at 120° C., and conditioned at 70° C. and 50% relative humidity prior to testing. The sheet serves as control. The sheet is tested for stiffness. The result is reported in Table I.

(b) To the beaten stock prepared as in Part (a), there is added 0.4% of tris-(1-aziridinyl) phosphine oxide (APO). The sheet is formed and tested for stiffness. Table I reports the result.

(c) To the beaten stock prepared as in Part (b), there is added 0.1% of polyethylene imine (PEI). The sheet is formed and tested for stiffness. Table I reports the result.

EXAMPLE 2

To a 0.26% aqueous suspension of unbleached softwood kraft beaten paper stock of 30° SR freeness there is admixed 0.4% of tris-(1-aziridinyl) phosphine oxide (APO) and 0.1% of polyethylene imine (PEI). The pH is 8. After agitating the stock, the wet web is formed in the sheet mold, pressed, dried, cured and tested. The results are shown in Table I. The sheet has improved dry stiffness and dry tensile strength.

EXAMPLE 3

The same procedure is followed except that the two additives are admixed simultaneously to the stock. Again the paper product has improved dry stiffness as shown in Table I. Its burst strength is improved by 13% over the control. Also its dry tensile strength is increased by 15%.

EXAMPLE 4

Example 3 is repeated using 0.8% of APO. The stiffness of the paper sheet under dry conditions is increased, as shown in Table I. Further improvement of 15% over the control of burst strength is found. Dry tensile strength is also increased.

TABLE I.—EVALUATION OF TREATED FIBERS

| Example | Additive | Stiffness | |
|---|---|---|---|
| | | (Mg.) | Percent I |
| 1a | None | 120 | |
| 1b | APO | 113 | |
| 1c | PEI | 119 | |
| 2 | APO+PEI | 186 | 55 |
| 3 | APO+PEI | 209 | 74 |
| 4 | APO+PEI | 194 | 62 |

Percent I = Percent Improvement over best control.

EXAMPLE 5

To the aqueous suspension, as prepared in Example 1, there is added 2% on the weight of the fiber of alum to adjust the pH to 4.5. There is then added 0.4% of APO. The sheets are formed and tested. They exhibit increased stiffness both under dry and wet conditions.

With 0.8% APO a paper having improved stiffness is also obtained.

EXAMPLE 6

Example 5 is repeated in the absence of alum, the pH is 8. The resulting sheets exhibit dry stiffness improved by 55% over the control.

EXAMPLE 7

The aqueous suspension is adjusted with alum to a pH of 4.5. There are added 0.5% of PEI and 0.4% APO. The sheets exhibit improved dry stiffness.

EXAMPLE 8

To an aqueous suspension of paper stock having a pH of 4.5 there are admixed 0.4% APO followed by 0.1% of PEI. The formed sheets are dried and cured. They exhibit increased wet stiffness.

EXAMPLE 9

The procedure of Example 8 is followed but both additives are added simultaneously. The paper sheets have increased wet strength and wet stiffness.

We claim:

1. A process for making paper products having improved strength and stiffness which comprises adding to an aqueous suspension of cellulosic fibers polyethylene imine in an amount of from 0.01 to 10% and tris-(1-aziridinyl) phosphine oxide in an amount of from 0.04 to 10%, each based upon the dry weight of the fibers, forming said suspension into a paper product, and curing said cellulosic product so as to react said cellulosic fibers with said polyethylene imine, and said tris-(1-aziridinyl) phosphine oxide.

2. The process of claim 1 wherein the ratio of said polyethylene imine to said tris-(1-aziridinyl) phosphine oxide is in the range of from 1:1 to 1:10.

3. The process of claim 1 wherein said addition and reaction is carried out under acidic condition.

4. The process of claim 1 wherein said addition and reaction is carried out under basic conditions.

5. The process of claim 1 wherein said tris-(1-aziridinyl)

phosphine oxide is added to said aqueous suspension of cellulosic fibers prior to the addition of said polyethylene imine.

6. A paper product having improved strength and stiffness which comprises cellulosic fibers reacted with polyethylene imine in an amount of from about 0.01 to 10% and tris-(1-aziridinyl) phosphine oxide in an amount of from 0.04 to 10%, each by weight based upon the dry weight of the fibers.

7. The paper product of claim 6 wherein the ratio of said polyethylene imine to said tris-(1-aziridinyl) phosphine oxide is in the range of from 1:1 to 1:10.

References Cited by the Examiner

UNITED STATES PATENTS

| | | |
|---|---|---|
| 2,889,289 | 6/1959 | Reeves et al. |
| 2,901,444 | 8/1959 | Chance et al. |
| 3,034,919 | 5/1962 | Steinhauer. |
| 3,085,029 | 4/1963 | Miles et al. _____ 162—159 X |
| 3,146,228 | 8/1964 | Chance _____ 162—159 X |

DONALL H. SYLVESTER, *Primary Examiner.*

S. LEON BASHORE, *Examiner.*